2 Sheets--Sheet 1.
E. W. KITCHEN.
Churns.
No. 151,887. Patented June 9, 1874.
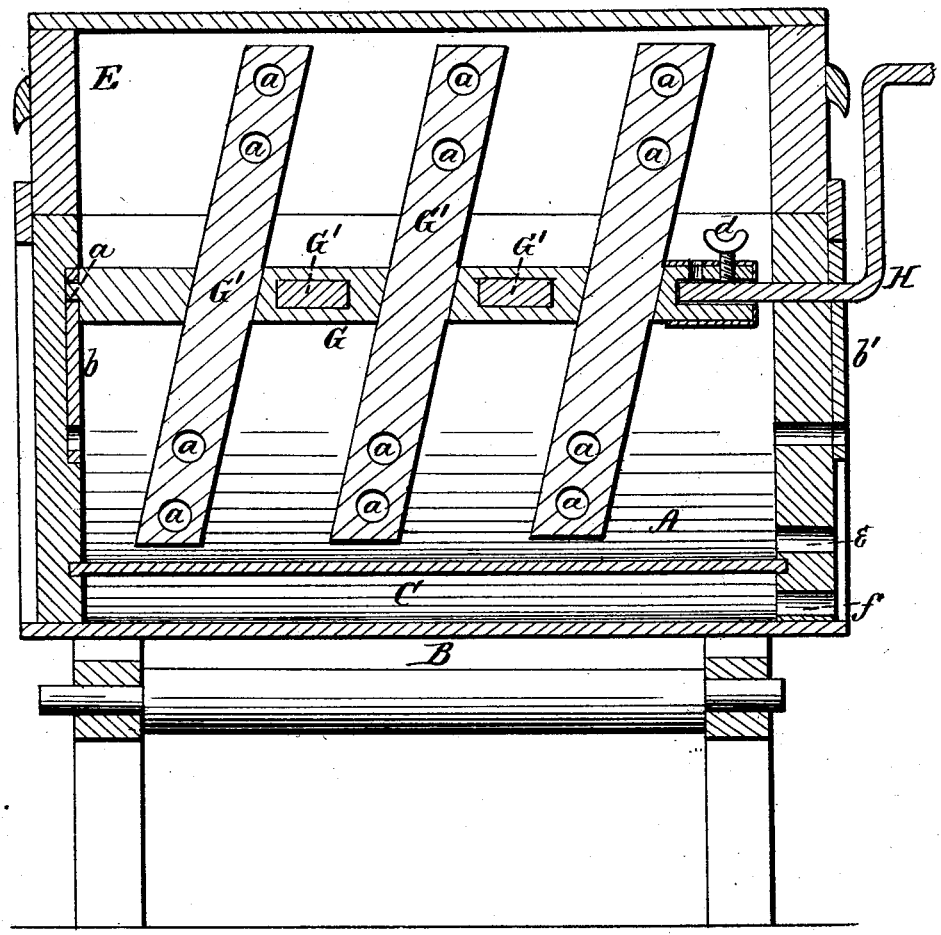
WITNESSES.
F. L. Durand
C. L. Evert
INVENTOR.
Emanuel W. Kitchen
Alexander Amator
By
Attorneys.

2 Sheets--Sheet 2.
E. W. KITCHEN.
Churns.
No. 151,887. Patented June 9, 1874.
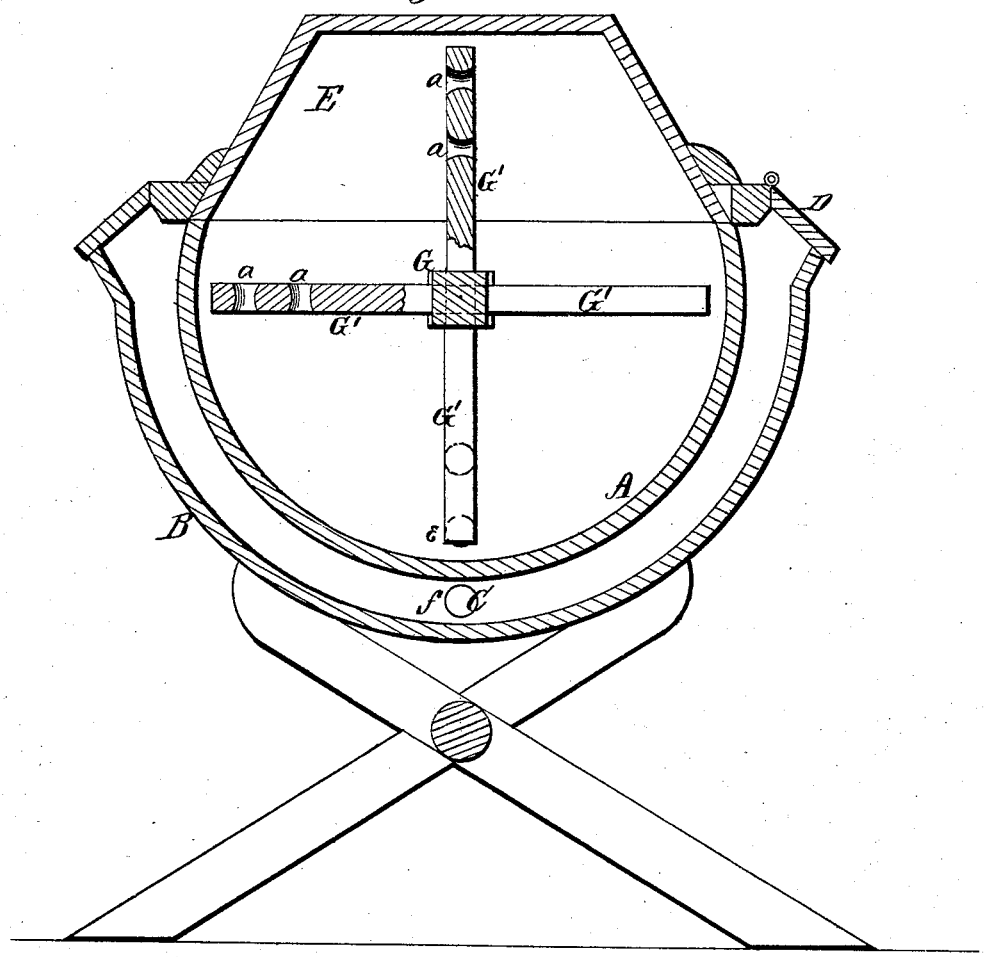
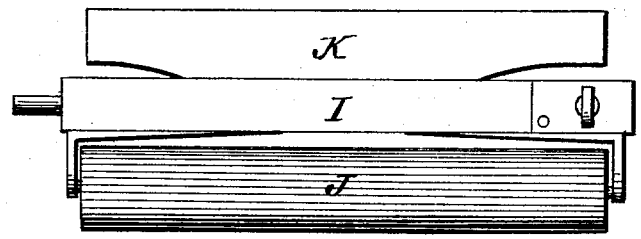
WITNESSES.
F. L. Ousand
C. L. Evert,
INVENTOR
Emanuel W. Kitchen
Alexander Mason
By
Attorneys

UNITED STATES PATENT OFFICE.

EMANUEL W. KITCHEN, OF DOYLESTOWN, PENNSYLVANIA.

IMPROVEMENT IN CHURNS.

Specification forming part of Letters Patent No. 151,887, dated June 9, 1874; application filed March 23, 1874.

*To all whom it may concern:*

Be it known that I, EMANUEL W. KITCHEN, of Doylestown, in the county of Bucks and in the State of Pennsylvania, have invented certain new and useful Improvements in Churns; and do hereby declare that the following is a full, clear, and exact description thereof, reference being had to the accompanying drawings, and to the letters of reference marked thereon, making a part of this specification.

The nature of my invention relates to a churn; and it consists of a box adapted for journaling a shaft at two different elevations, and having a removable crank constructed for fitting and retention in a dasher-shaft at the higher elevation, and into a butter-worker shaft at the lower, all as more fully hereinafter set forth.

In order to enable others skilled in the art to which my invention appertains to make and use the same, I will now proceed to describe its construction and operation, referring to the annexed drawing, in which—

Figure 1 is a transverse vertical section, and Fig. 2 a longitudinal vertical section, of my machine. Fig. 3 is a side view of the butter-working attachment.

A and B represent two nearly semicylindrical shells, placed one within the other, so as to form a suitable space, C, between them. This space is permanently closed on one side, and on the other side is a hinged door or lid, D, so that hot or cold water can be poured into said space, and thereby heat or cool the milk or cream in the inner chamber A. The chamber A is covered by a raised or concave lid, E. The churn-dasher is composed of a square central shaft, G, through which passes two series of bars, G', which stand at an angle with the shaft, and are inclined in opposite directions from each other. They are also so arranged that the bars of one series pass in between the bars of the other series. Each bar or dasher has at each end holes $a\ a$ bored through it, which holes are countersunk on both sides, as shown in Fig. 1. The shaft G' has at one end a gudgeon, $a$, which is inserted and has its bearings in a metal bar, $b$, secured on the inside at one end of the interior chamber A. On the outside of the other end of this chamber is secured a similar metal bar, $b'$, and through it is inserted a crank, H, into the churn, the inner end of said crank being inserted in a hole in that end of the central shaft G, and fastened by means of a set-screw, $d$. The butter-worker is composed of a center shaft, I, provided on one side with a roller, J, and on the other side with a beater, K. The shaft I is attached in the same manner as the dasher-shaft G, but low enough down to allow the roller and beater to work the butter on the bottom of the interior chamber A. $e$ is the outlet from the chamber A, and $f$ the outlet from the space C.

This machine keeps the cream or milk at the proper temperature for churning, whereby the butter will be churned quicker and better than by the churns now generally in use. The butter is worked in the same churn by simply removing the churn-dasher and substituting the butter-worker. The butter may be left in the churn when worked, and kept cool until ready for shipment or for use.

Having thus fully described my invention, what I claim as new, and desire to secure by Letters Patent, is—

The box A B adapted for journaling a shaft at two different elevations, and having a removable crank constructed for fitting and retention in a churn-dasher shaft at the higher elevation, and into a butter-worker at the lower, substantially as shown and described.

In testimony that I claim the foregoing I have hereunto set my hand this 14th day of February, 1874.

EMANUEL W. KITCHEN.

Witnesses:
A. P. SCHURZ,
NATHAN R. WORTHINGTON.